April 4, 1961

R. C. WILCOX 2,978,599

INDICATING SYSTEM

Filed Nov. 20, 1957

INVENTOR.
ROY C. WILCOX
BY
ATTORNEY

United States Patent Office 2,978,599

Patented Apr. 4, 1961

2,978,599

INDICATING SYSTEM

Roy C. Wilcox, Haddonfield, N.J., assignor to Radio Corporation of America, a corporation of Delaware Filed Nov. 20, 1957, Ser. No. 697,711

5 Claims. (Cl. 310—168)

Figure 1B:
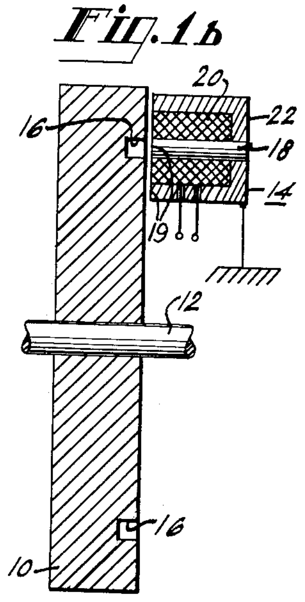

This invention relates to a magnetic system for providing an electrical indication of a mechanical movement.

Many systems have been devised for providing an electrical indication of mechanical movements such as, for example, the rotational position of a shaft. One such system employs photo-electric techniques. Light is reflected from painted serrations on a rotating shaft, for example, to a photocell which generates electrical synchronizing signals. Other systems have employed a so-called magnetic tone wheel wherein a disc type member of non-magnetic material but having inserts of a magnetic material positioned around the periphery thereof is mounted to a shaft. A magnetic pickup device senses these magnetic inserts to provide an electrical signal. These prior art systems, while generally quite satisfactory, are subject to the objection of being relatively complex and expensive. Also the electrical signals obtainable do not have the degree of sharpness and accuracy required for many operations.

It is therefore an object of the present invention to provide an improved magnetic tone wheel pulse generator which is simple, economical, and provides relatively sharp, accurate indicating signals.

Another object of the present invention is to provide electrical indications which vary as a function of mechanical movement.

An additional object of the present invention is to provide an improved tone wheel for generating electrical signals indicating rotational movement of a shaft, which signals are more accurately generated than those heretofore known.

According to the invention a member made of a magnetically susceptible material has holes of a predetermined shape formed therein to cause a rarification of a portion of the magnetic material. The member is moved such that the holes pass by one pole piece of a magnetic transducer so as to produce a change of the magnetic reluctance of the magnetic circuit of the transducer. If a magnetic flux is established in the transducer, and the above mentioned one pole of the transducer is formed to have an end section of the same shape and area as the holes, a very sharp change in flux occurs when each hole comes into registry with the pole piece. A coil placed about the pole piece thus produces a very sharp voltage as the flux changes.

In a preferred form of the invention to sense the rotation of a shaft, a disc like member, disc, or tone wheel of a magnetically susceptible material is mechanically coupled to the shaft. A hole, or more specifically a circular opening, is formed in one face of the disc. These holes may also be termed as intrusions or as portions wherein the magnetic material is rarified. A concentric pickup head, formed by a center pole piece and an outer pole piece in the form of a cylindrical member placed concentrically about the center pole piece is positioned adjacent that face of the disc having the circular opening. The pickup head is positioned such that as the disc rotates the circular opening passes directly by the end of the center pole piece. When the circular opening in the disc is directly opposite (in registry with) the center pole piece, the magnetic reluctance of the flux path of the concentric pickup head is increased. By making the diameter of the center pole piece of the pickup head substantially the same as the diameter of the hole in the disc very sharp flux changes result. Any flux flowing through the pickup head is thus decreased. A sharp voltage pulse will appear across the output terminals of a pickup coil placed about the center rod of the pickup head. Further, the concentric pickup head shields the arrangement from stray flux.

Figure 1A:
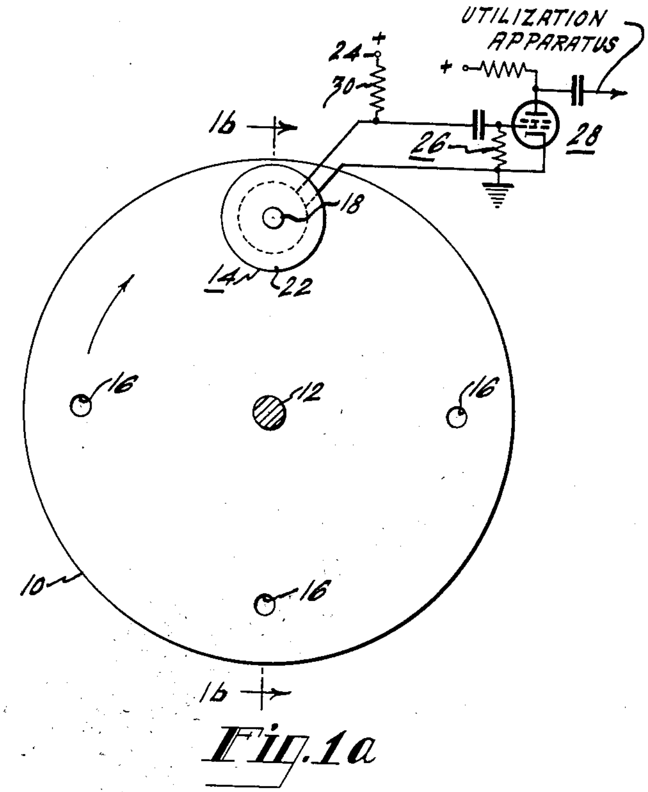
Figure 2:
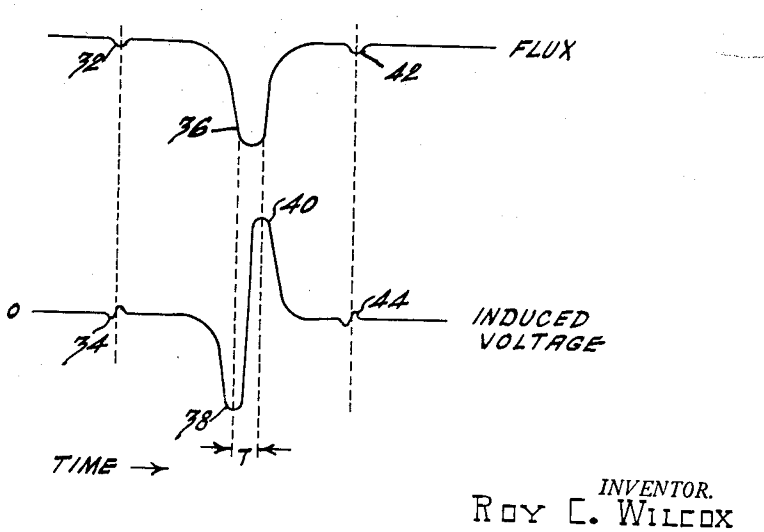

The novel features of this invention will best be understood from the following description, when read in connection with the accompanying drawings, in which like reference numerals refer to like parts in which:

Figure 1*a* is a plan view of the rotating disc and pickup head in accordance with this invention;

Figure 1*b* is a side sectional view of the rotating disc and pickup head in accordance with this invention; and Figure 2 includes graphs illustrating the flux and voltage changes occurring in the pickup coil as the rotating disc moves.

Referring now to Figure 1, there is illustrated apparatus for sensing the rotational speed or position of a shaft or for sensing the angular motion of a body. This speed sensing means comprises a disc-like member, disc, tone wheel, or wheel 10 mounted upon a rotating shaft 12 in combination with a magnetic pickup 14. The shaft 12 may, for example, be the drive shaft of a rotating piece of machinery. The disc 10 and magnetic pickup 14 are shown in plan view (Figure 1*a*) and in a side view (Figure 1*b*) taken along the section 1*b* of Figure 1*a*. The disc 10 is of a magnetically susceptible material and is illustrated as having four equally spaced circular openings 16 formed on one planar (or flat) face thereof. These circular openings 16, which may also be termed intrusions, holes, or portions wherein the magnetic material is rarified, may be placed at any desired angular locations, which locations it is desired to sense. Also more or less circular openings (hereinafter referred to as holes) may be formed as desired. The particular number of holes 16 selected is merely by way of illustration and not by way of limitation. Each of the holes 16 may be formed by drilling part way or completely through the disc 10 at locations placed at equal radial distances from the shaft 12.

The pickup 14 is mounted in a fixed position and is a concentric type transducer having a center circular rod or pole 18 of essentially the same diameter as each of the circular openings 16. The center pole 18 as well as the holes 16 are positioned or formed perpendicular to the planar face of the disc 10. The center pole 18 of the pickup 14 has wound thereon, over an insulator (not shown), a strip of wire to form a suitable pickup coil 20. The pickup coil may be, for example, 350 turns of Number 42 wire formed into a doughnut type assembly. After the pickup coil 20 is wound, this assembly comprising the center pole 18 and the coil 20 is inserted into a cup like member which provides the outer pole 22 for the pickup 14. The outer edge of the cup 22 is concentric about the center pole 18 and forms a continuous magnetic circuit therewith. The end surfaces 19 of center pole 18 and the outer pole 22 are preferably complementary opposed to the surface of the disc 10. In this instance, where the disc 10 has a planar surface, the end portions 19 preferably lie in a plane parallel to the face thereof. The ends of the coil 20 are coupled through a suitable isolating and differentiating circuit 26 to the cathode and control grid of a vacuum tube amplifier 28 whose output is coupled to the desired utilization apparatus. Direct current (D.C.) energization for maintaining flux in the concentric pickup head is derived from a source of D.C. potential 24, illustrated as 300 volts, coupled through a resistor 30, illustrated as a 27K resistor, and through the pickup coil 20 to ground.

In operation, as the shaft 12 imparts a mechanical movement to the disc 10, the holes 16 successively sweep past the center pole piece 18. Due to the constant direct current flowing through the coil 20 from the D.C. source 24, a constant flux path is established through the center pole piece 18, through the disc 10, and through the outer pole piece 22 of the concentric pickup 14 to complete a relatively low reluctance magnetic circuit.

As any given hole 16 crosses the outer pole of the concentric pickup 14, the reluctance of the magnetic circuit increases resulting in a very slight decrease in flux below the normal level. This flux decrease is indicated by the discontinuity 32 in the flux wave form of Figure 2. Figure 2 includes a flux wave form plotted against time illustrating the manner in which the flux in the pickup head 14 varies as a hole 16 passes. An induced voltage wave form also plotted against time illustrates the corresponding voltage changes occurring in the coil 20 as a result of the flux changes. This small change 32 in flux results in a similar small change in the induced voltage in the coil 20 which is differentiated by the differentiating circuit 26 and applied through amplifier 28 to utilization apparatus. The flux change produces a voltage illustrated by the single cycle approximate sine wave 34 in the induced voltage waveform. The effect of this induced voltage may be eliminated by biasing the amplifier 28 so as to not conduct for such small values or by subsequent clipping. The flux disturbance is small since hole 16, which tends to increase the magnetic head reluctance, occupies only a small portion of the circumference of the outer pole 22.

However, as the rotation of the disc continues and the particular hole 16 crosses the central rod or pole 18, there is a relatively large change in the magnetic reluctance of the path through which the flux produced by the concentric head 14 may travel. This change in reluctance due to the hole 16 is such as to substantially reduce the flux in the concentric pickup head 14 as indicated by the negative-going dip 36 in the flux wave form (Figure 2). The decrease in flux reaches a minimum and then returns to normal as the hole 16 traverses the center pole 18. The flux change gives rise to an induced voltage in the coil 20 as is indicated in the induced voltage curve of Figure 2. The induced voltage goes through first a negative peak 38 which occurs as the hole 16 and the center pole 18 approach direct alignment or registry. As the disc rotation continues, the hole 16 leaves direct alignment with the center pole 18 and the induced voltage very rapidly returns from the negative peak 38 to a positive peak 40 and thence to the normal zero condition. The slope of the voltage curve between the negative and positive maximums 38 and 40 depends upon the time T required for edges of the hole 16 to pass the center pole piece 18. The change in voltage is differentiated by the differentiating circuit 26 and thus produces at the plate of amplifier 28 a negative going marker pulse for the utilization apparatus. As the rotation of the disc 10 continues, the hole 16 traverses the outer pole 22 of the concentric pickup head 14 producing a single minimal decrease in flux 42 as was the case when the hole 16 approached the concentric pickup head. A corresponding negligible induced voltage change 44 occurs in the coil 20.

One advantage of this arrangement is that the magnetic path between the pickup head 14 and the disc 10 is substantially closed and there is very little possibility of stray flux creating any false signals. In addition, a narrow, sharp and accurate pulse is provided at the precise time interval that the center pole 18 of pickup head 14 is traversed by any given hole 16. The disturbance created as the peripheral edges of the pickup head 14 are traversed by the hole 16 is of no consequence due to the small portion of the pickup head's circumference occupied by the hole 16.

The material used for the pickup head and disc may be any suitable magnetically susceptible material such as ferrites, cold rolled steel or other materials. The particular material employed depends upon the frequencies required and the particular application required.

In alternative embodiments (not shown) the pickup head 14 need not be of the concentric type as illustrated in Figure 1. In fact, so long as the center pole piece 18 of Figure 1 has substantially the same cross sectional shape as the hole 16 (the cross sections to be taken along the same axis perpendicular to the flat face of the disc 10) the return path for the flux to be established in the center pole piece 18 may be completed by, for example, a simple rod similar to the center pole piece 18. Other shapes, of course, may be employed as desired. The only limitations upon the return flux path is that the pole piece therefor should be positioned such that the hole 16 does not intercept therewith during the mechanical movement involved.

Other modifications will become apparent to one skilled in the art. For example, the number of holes placed in the given face of the disc is immaterial provided there is a definite separation between adjacent holes. Also several pickup heads may be employed. These may be at different radial or angular distances about the center shaft. Also mechanical movement to be detected need not be that of a rotating disc. For example, any mechanical movement of a member repetitive or not may be detected by employing the principles of this invention.

There has thus been described a very simple and accurate method of electrically sensing mechanical movements.

What is claimed is:

1. Apparatus for providing an electrical indication of a mechanical movement comprising: a member having a planar surface thereon and adapted to move in synchronism with said mechanical movement; said member being of a magnetically susceptible material; a portion of said magnetically susceptible material bounding said planar surface being removed; a second member having a first magnetic pole piece and a second magnetic pole piece directly contacting said first pole piece to form a continuous magnetic circuit with said first pole piece, said second pole piece being in the form of a cup-like member concentric about said first pole piece; means to establish magnetic flux in said second member; said first pole piece having a planar surface juxtaposed to said first member planar surface; the shape and area of said first pole piece planar surface and the shape and area of the removed portion of said material bounding on said first member planar surface being substantially the same; said second pole piece having an end surface juxtaposed to said first member planar surface, the first pole piece planar surface and the second pole piece end surface being in a plane parallel to said first member planar surface; said first member adapted to complete a flux path between said first and second pole pieces whereby said established magnetic flux completes a path through said first pole piece, said first member, and said second pole piece; said first pole piece being positioned such that said removed portion registers with said first pole piece as it is moved in synchronism with said mechanical movement whereby said flux in said second member changes; means to detect said flux changes and to produce electrical signals in response thereto whereby said electrical signals are representative of said mechanical movement.

2. Apparatus for providing an indication of a mechanical movement comprising a member having a flat surface thereon and adapted to move in synchronism with said mechanical movement, said member being of a magnetically susceptible material and having an area on said flat surface of a predetermined shape wherein said magnetically susceptible material is rarified, a concentric magnetic transducer having a center pole piece and an outer pole piece directly contacting one end of said center pole piece to form a continuous magnetic circuit with said center pole piece, said outer pole piece being concentric about the said center pole piece, means to establish magnetic flux in said transducer, said transducer being positioned closely adjacent said member flat surface such that said predetermined shaped area passes by the other end of said center pole piece in said transducer whereby the flux in said transducer changes, said predetermined shaped area having substantially the same shape and area as that portion of said center pole that is adjacent said flat surface, and means to detect said flux changes and to produce an electrical signal in response thereto.

3. Apparatus for providing an electrical indication of a repetitive mechanical movement comprising a rotating disc having a plurality of circular openings on one face thereof, said rotating disc being of a magnetically susceptible material, a concentric magnetic pickup head having a center pole and an outer pole directly contacting one end of said center pole to form a continuous magnetic circuit with said center pole, said outer pole being concentric about said center pole, said concentric pickup head being positioned with respect to said one face of said rotating disc member such that rotation thereof causes each of said openings to pass by the other end of said center pole of said pickup head, said outer pole having an end surface juxtaposed to said one face of said disc member, said outer pole end surface and the other end of said center pole being in a plane parallel to said one face of said disc member, means to establish a magnetic flux through said pickup head and the portion of said disc contiguous to said pickup head, the other end of said center pole and each of said circular openings being substantially circular and of the same diameter, and means associated with said pickup head to derive an induced voltage from any flux changes in said pickup head whereby a sharp accurate electrical signal is generated thereby as each said circular opening registers with said center pole.

4. Apparatus for providing an electrical indication of a repetitive mechanical movement comprising a rotating disc having a hole on one face thereof, said rotating disc being of a magnetically susceptible material, a concentric magnetic pickup head having a center pole and an outer pole directly contacting one end of said center pole piece to form a continuous magnetic circuit with said center pole, said outer pole being concentric about said center pole, said concentric pickup head being positioned with respect to said one face of said rotating disc member such that rotation thereof causes said hole to pass by the other end of said center pole of said pickup head, said outer pole having an end surface juxtaposed to said one face of said disc member, said outer pole end surface and the other end of said center pole being in a plane parallel to said one face of said disc member, means to establish a magnetic flux through said pickup head and the portion of said disc contiguous to said pickup head, the other end of said center pole and said hole each being circular and of the same diameter, and means associated with said pickup head to derive an induced voltage from any flux changes in said pickup head whereby a sharp accurate electrical signal is generated thereby as said hole passes said center pole.

5. Apparatus for providing an electrical indication of a mechanical movement comprising a disc adapted to be rotated in synchronism with said mechanical movement, said disc being constructed of a magnetically susceptible material and having a hole in one face thereof, a magnetic pickup head including a center pole in the shape of a circular rod and an outer pole directly contacting one end of said center pole to form a continuous magnetic circuit with said center pole, said outer pole being concentric about said center pole and having an end surface, the other end of said center pole and said outer pole end surface being in a plane parallel to said one face of said disc, said pickup head being positioned with respect to said one face of said disc so that rotation of said disc causes said hole to pass by said other end of said center pole, means including a coil wound on said center pole to establish a magnetic flux through said center pole, said outer pole and the portion of said disc contiguous to said pickup head, said other end of said center pole and said hole each being circular and of the same diameter, and a differentiating circuit coupled to said coil and responsive to a change in the flux through said pick up head each time said hole registers with said other end of said center pole to provide a sharp electrical signal representative of said mechanical movement.

References Cited in the file of this patent

UNITED STATES PATENTS

| | | |
|---|---|---|
| 1,892,371 | Tuczek | Dec. 27, 1932 |
| 2,049,616 | Lilja | Aug. 14, 1936 |
| 2,110,144 | Durkee et al. | Mar. 8, 1938 |
| 2,433,207 | Eilenberger | Dec. 23, 1947 |
| 2,541,422 | Kirkland et al. | Feb. 13, 1951 |